(12) United States Patent
Hickerson

(10) Patent No.: US 10,974,082 B2
(45) Date of Patent: Apr. 13, 2021

(54) PORTABLE RESCUE TOOL

(71) Applicant: Snap-on Incorporated, Kenosha, WI (US)

(72) Inventor: William Hickerson, Hardyston, NJ (US)

(73) Assignee: Snap-on Incorporated

( * ) Notice: Subject to any disclaimer, the term of this patent is extended or adjusted under 35 U.S.C. 154(b) by 2 days.

(21) Appl. No.: 16/387,860

(22) Filed: Apr. 18, 2019

(65) Prior Publication Data

US 2019/0240513 A1 Aug. 8, 2019

Related U.S. Application Data

(62) Division of application No. 13/833,910, filed on Mar. 15, 2013, now Pat. No. 10,307,621.

(51) Int. Cl.
*B23D 17/04* (2006.01)
*A62B 3/00* (2006.01)
*F16D 121/26* (2012.01)

(52) U.S. Cl.
CPC .......... *A62B 3/005* (2013.01); *F16D 2121/26* (2013.01)

(58) Field of Classification Search
CPC ........ B23D 17/02; B23D 17/04; B23D 17/06; B23D 17/08; B23D 29/026; A62B 3/005
USPC .............. 188/67, 156–164; 254/124; 72/449; 30/228
See application file for complete search history.

(56) References Cited

U.S. PATENT DOCUMENTS

| | | | |
|---|---|---|---|
| 5,520,064 A * | 5/1996 | Hickerson | A62B 3/005 192/20 |
| 5,544,862 A * | 8/1996 | Hickerson | A62B 3/005 254/124 |
| 6,218,746 B1 | 4/2001 | Gouge | |
| 6,277,013 B1 * | 8/2001 | Sasaki | B24B 23/02 451/344 |
| 7,259,536 B1 | 8/2007 | Ketner | |
| 8,172,003 B2 * | 5/2012 | Robieu | F16D 43/14 173/176 |
| 2003/0032519 A1 | 2/2003 | Lovatt | |
| 2005/0079808 A1 | 4/2005 | Tiede et al. | |
| 2008/0129234 A1 | 6/2008 | Buente et al. | |

(Continued)

OTHER PUBLICATIONS

Canadian Office Action for Application No. 2,904,108 dated Dec. 11, 2019, 4 pages.

(Continued)

*Primary Examiner* — Christopher P Schwartz
(74) *Attorney, Agent, or Firm* — Seyfarth Shaw LLP

(57) ABSTRACT

A portable rescue tool that is powered by an electric motor. The electric motor has a drive output shaft that transfers rotational power to an angle rotary gearbox. The angle rotary gearbox has an output shaft that is oriented about 90 degrees from the rotational axis of the motor output shaft and is geared so as to increase the torque and reduce the speed of the rotational power. The angle rotary gearbox provides a reduced speed, high torque output at an output shaft that is delivered by a single chain drive to a main rotary actuator where two actuator arms are controlled to move away from each other and toward each other in the operation of the rescue tool. The portable rescue tool is designed to be of a low weight and enhanced cooling properties as present rescue tools.

10 Claims, 4 Drawing Sheets

(56) References Cited

U.S. PATENT DOCUMENTS

| | | | |
|---|---|---|---|
| 2013/0175066 A1* | 7/2013 | Zhang .................... | B25B 21/00 173/47 |
| 2016/0039017 A1* | 2/2016 | Lawlor et al. ...... | F16H 25/2252 30/228 |
| 2019/0240514 A1* | 8/2019 | Hickerson .............. | A62B 3/005 |

OTHER PUBLICATIONS

Mexican Office Action for Application No. MX/a/2015/013143 dated Jul. 15, 2020, 5 pages.

\* cited by examiner

PORTABLE RESCUE TOOL

CROSS REFERENCE TO RELATED APPLICATIONS

This application is a division of U.S. Ser. No. 13/833,910, filed Mar. 15, 2013, the disclosure of which is herein incorporated by reference in its entirety.

FIELD OF THE INVENTION

The present invention relates to a device that can be used as a rescue tool by providing a spreading or cutting motion under high loads and, more particularly, to a portable rescue tool to carry out an emergency rescue that is lighter and more efficient than prior rescue tools

BACKGROUND OF THE INVENTION

Rescue tools know as "Jaws of Life" type devices are specialized tools used by various rescue personnel such as police, firemen and paramedics generally for the purpose of extricating accident victims from vehicles whose exits have been rendered inoperative. These tools require spreading and closing forces for opening or ripping apart inoperable doors or for cutting through relatively thick metal layers. Pushing or pulling forces of 7,000 to 15,000 pounds at the tips are considered to be normal for the proper operation of such tools.

A rescue tool of the present type is shown and described in U.S. Pat. Nos. 5,544,862 and 5,520,064 of Hickerson. In those patents, there can be seen a rescue tool that is battery powered and which is capable of high torque spreading and cutting motion of its jaws. While very useful and an improvement in its time, the rescue tool of those patents can be improved upon by reducing its weight to make the device easier to handle and by increasing its efficiency as to heat dissipation so as to lengthen the life of the motor.

Accordingly, it would be advantageous to have a portable rescue tool that can carry out the functions of the rescue tools described in the aforementioned U.S. Patents but which has increased efficiency, lower weight, is less expensive to manufacture and has improved heat dissipation.

SUMMARY OF THE INVENTION

Now, in accordance with the present invention, there is provided a portable rescue tool that is powered by an electric motor. The electric motor has a drive output shaft that transfers rotational power to an angle rotary gearbox. The angle rotary gear box has an output shaft that is oriented about 90 degrees from the rotational axis of the motor output shaft and is geared so as to increase the torque and reduce the speed of the rotational power.

That high torque is then transmitted by a single belt drive to a main rotary actuator to drive a pair of actuators having actuator arms that can be moved by the main rotary actuator so as to move away from and toward each other. The single belt drive reduces the weight of the overall portable rescue tool as well as provides a positive sprocketed drive between the angle rotary gear box and the main rotary actuator.

In the exemplary embodiment, there is a brake assembly that directly contacts and provides a braking force to the motor shaft where the braking is the most effective. The braking assembly brakes the motor shaft when the power to the motor is terminated and allows the motor shaft to rotate freely when the motor is being energized.

The portable rescue tool is readily manipulated by the user by providing a rubber grip located just adjacent to the proximal end of the motor housing and a handle bar that is angled slightly forwardly toward the working end of the portable rescue tool so that the user can have a firm, balanced hold on the portable rescue tool and can manipulate the portable rescue tool to carry out the desired operation.

In the exemplary embodiment, the main rotary actuator is rotatably positioned in the portable rescue tool between an upper and lower plate and there is a clutch mechanism that allows the user to loosen and tighten a threaded knob to allow the entire main rotary actuator to rotate in the portable rescue tool or be prevented from rotation. Again, the components of the clutch as well as the assembly thereof are designed to reduce the weight of the portable rescue tool to make it easier for the user to manipulate the portable rescue tool in carrying out its function.

Other features of the present portable rescue tool will become more apparent in light of the following detailed description of a preferred embodiment thereof and as illustrated in the accompanying drawings.

DETAILED DESCRIPTION OF THE INVENTION

Figure 1:
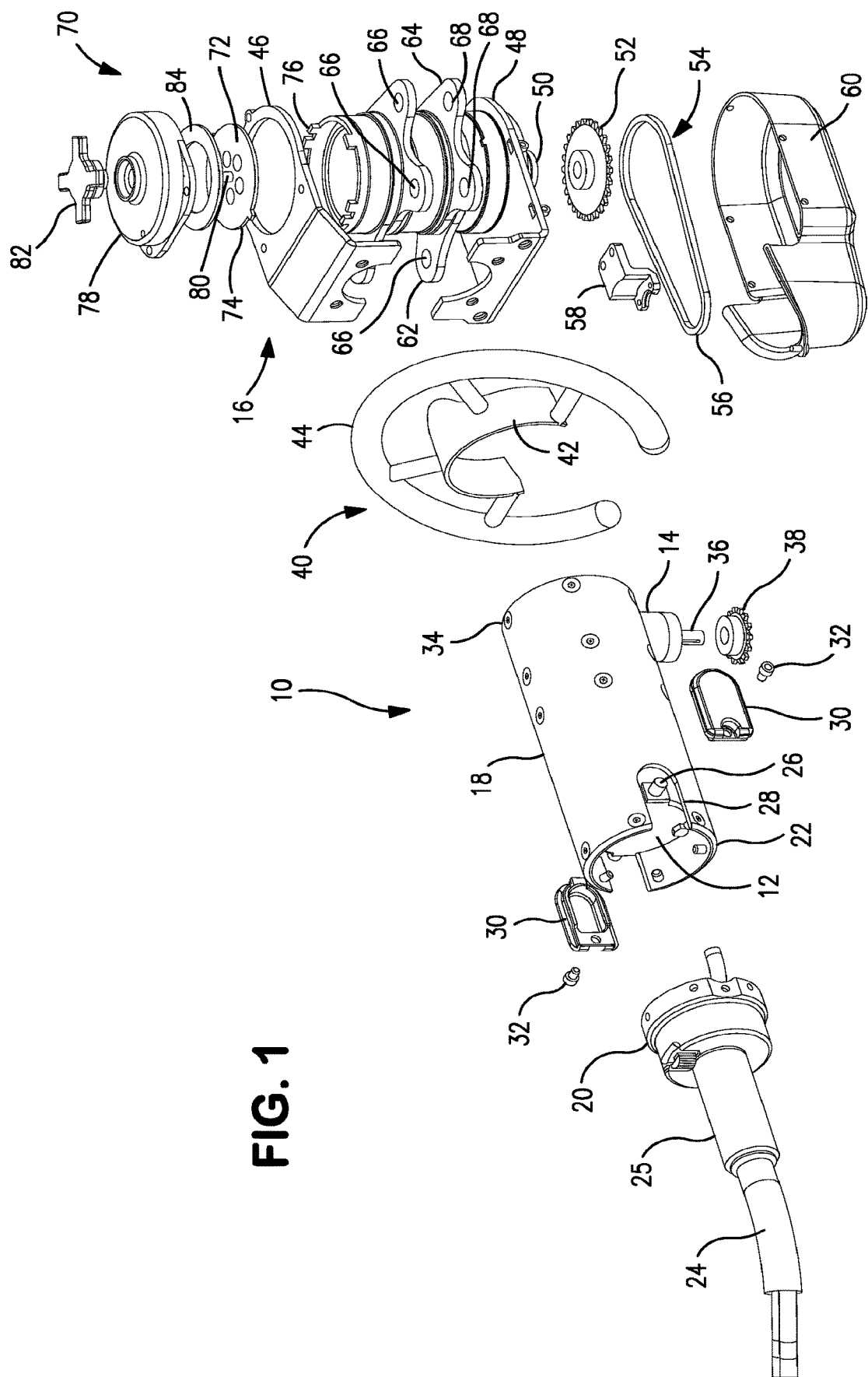
FIG. 1 is an exploded view of an exemplary embodiment of the portable rescue tool of the present invention.

Referring now to FIG. 1, there is shown an exploded view of the portable rescue tool 10 constructed in accordance with the present invention. As can be seen, the portable rescue tool 10 basically comprises a motor 12, an angle rotary gearbox 14 and a main rotary actuator 16. As can be seen, the motor 12 is contained with a motor housing 18 and a housing end cap 20 covers the proximal end 22 of the motor housing 18 and can be secured thereto by screws.

An electrical cable 24 passes through the housing end cap 20 to supply election energy to the motor 12. The electrical cable 24 also passes through a rubber grip 25 that can be gripped by the user in order to carry out the manipulation of the portable rescue tool 10.

The source of the electrical power can be a battery, not shown, and may be a variety of voltages, however, in the exemplary embodiment, the motor 12 is a 12 volt D.C. motor to be compatible with automobile or truck batteries.

In the embodiment of FIG. 1, the motor 12 has pins 26 (only one of which is shown in FIG. 1) that enter into slots 28 in the motor housing 18 and covers 30 can be secured to the motor housing 18 by means such as screws 32 to cover the slots 28.

At the distal end 34 of the motor housing 18, the angle rotary gearbox 14 has an output shaft 36 emerging therefrom and, as will be later explained, the rotational axis of the output shaft 36 is generally at a right angle with respect to the longitudinal rotational axis of the motor 12. A sprocket 38 is located at the free end of the output shaft 36.

A handle 40 is affixed to the external circular motor housing 18. The handle 40 has an internal circular flange 42 that conforms to, and is affixed to, the exterior circular configuration of the motor housing 18 and has an external circular handle bar 44 that can be gripped by the user. When assembled to the motor housing 18, the handle bar 44 is tilted slightly forwardly for the convenient gripping and manipulation by the user.

As such, the user can readily manipulate the portable rescue tool 10 by grasping the circular handle bar 44 with one hand and the rubber grip 25 with the other hand and move the portable rescue tool 10 to the desired orientation for its desired use.

As also can be seen in FIG. 1, the main rotary actuator 16 is affixed to the motor housing 16 by means of an upper plate 46 and a lower plate 48 with the main rotary actuator 16 sandwiched therebetween. At the lower end of the main rotary actuator 16, there is an input shaft 50 that is rotatable to operate the main rotary actuator 16. A sprocket 52 is affixed to the free end of the input shaft 50 and a drive coupling 54 couples the output shaft 36 of the angle rotary gearbox 14 to the input shaft 50 of the main rotary actuator 16.

In the exemplary embodiment the drive coupling 54 can be a single chain belt 56 that connects between the sprocket 38 on the output shaft 36 of the angle rotary gearbox 14 and the larger sprocket 52 at the free end of the input shaft 50 of the main rotary actuator 16.

One of the sprocket 38 on the output shaft 36 or the larger sprocket 52 on the input shaft 50 of the main rotary actuator 16 may include a slip mechanism that is commercially available and one supplier is Martin Sprocket & Gear, Inc. of Arlington, Tex. The mechanism is a torque limiting clutch where a driven member slips when a torque overload is present. Typically, the activation of the torque limiting clutch makes a clicking sound when operational and thus the user is alerted that the torque overload is present and the mechanism is effectively limiting the torque.

A gearbox retainer 58 is also included to strengthen the connection between the lower plate 48 and the lower end of the angle rotary gearbox 14 and a bottom cover 60 encloses and protects the drive coupling 54.

The main rotating actuator 16 includes two rotating actuators 62, 64 that rotate with respect to each other either toward each other or away from each other depending on the rotational direction of the motor 12. Each of the rotating actuators 62, 64 has two pairs of aligned connecting holes, that is, upper holes 66 and lower holes 68. Only the upper and lower connecting holes 66, 68 on the rotating actuator 64 are shown in FIG. 1, however, similar holes are present on the other rotating actuator 62.

The purpose of the aligned upper and lower connection holes 66, 68 are to connect actuator arms (not shown in FIG. 1), that are used to pry or cut material by selectively having the actuator arms close towards each other or move away from each other in the normal operation of a portable rescue tool.

Atop of the main rotating actuator 16 is a clutch mechanism 70 that controls the rotational movement of the main rotating actuator 16 with respect to the upper and lower plates 46, 48, that is, the clutch mechanism 70 either allows the main rotating actuator 16 to rotate within the upper and lower plates 46, 48 or prevents that rotational movement.

The clutch mechanism 70 is comprised of a relatively few components and is therefore light so as to enhance the maneuverability of the portable rescue tool 10 and allows the main rotary actuator 16 to rotate with respect to the fixed upper and lower plates 46, 48. As can be seen, the clutch mechanism, comprises a clutch plate 72 that is non-rotatably affixed to the main rotary actuator 16 by means, such as tabs 74 that extend outwardly from the clutch plate 72 and which engage slots 76 formed on the upper surface of the main rotary actuator 16.

A clutch housing 78 is positioned atop of the upper plate 46 and can be firmly affixed thereto by screws or the like such that the clutch housing 78 does not move with respect to the upper plate 46. A clutch material (not shown) is provided on the inner, downward surface of the clutch housing 78 and a screw 80 is centrally located and passes though the clutch plate 72 and extends upwardly through the clutch housing 78 where it is captured by a threaded knob 82. Intermediate the clutch plate 72 and the clutch housing 78 is a friction disc 84.

Accordingly, to operate the clutch mechanism 70, the threaded knob 82 can be rotated by the user so as to tighten the clutch plate 72 against the clutch housing 78 such that the friction therebetween prevents the clutch plate 72 from rotating and it becomes fixed with respect to the clutch housing 78. Since the clutch plate 72 is keyed to the main rotary actuator 16 through the tabs 74 and slots 76, the main rotary actuator 16 is prevented from rotating with respect to the upper and lower plates 46, 48.

If the user wants to move the rotational position of the main rotary actuator 16, the threaded knob 82 is simply unscrewed from the screw 80, thereby releasing the clutch plate 72 and allowing the main rotary actuator 16 be rotated to the desired orientation and the threaded knob 82 again tightened to retain the main rotary actuator 16 in the desired position.

As such, the threaded knob 82 can be employed by the user to allow the rotational movement of the main rotating actuator 16. Thus, the clutch mechanism 70 locks the position of the main rotating actuator 16 in a positive manner, requiring relatively few parts, thereby reducing the overall weight and allowing the main rotating mechanism 16 to rotate in both directions.

Figure 2:
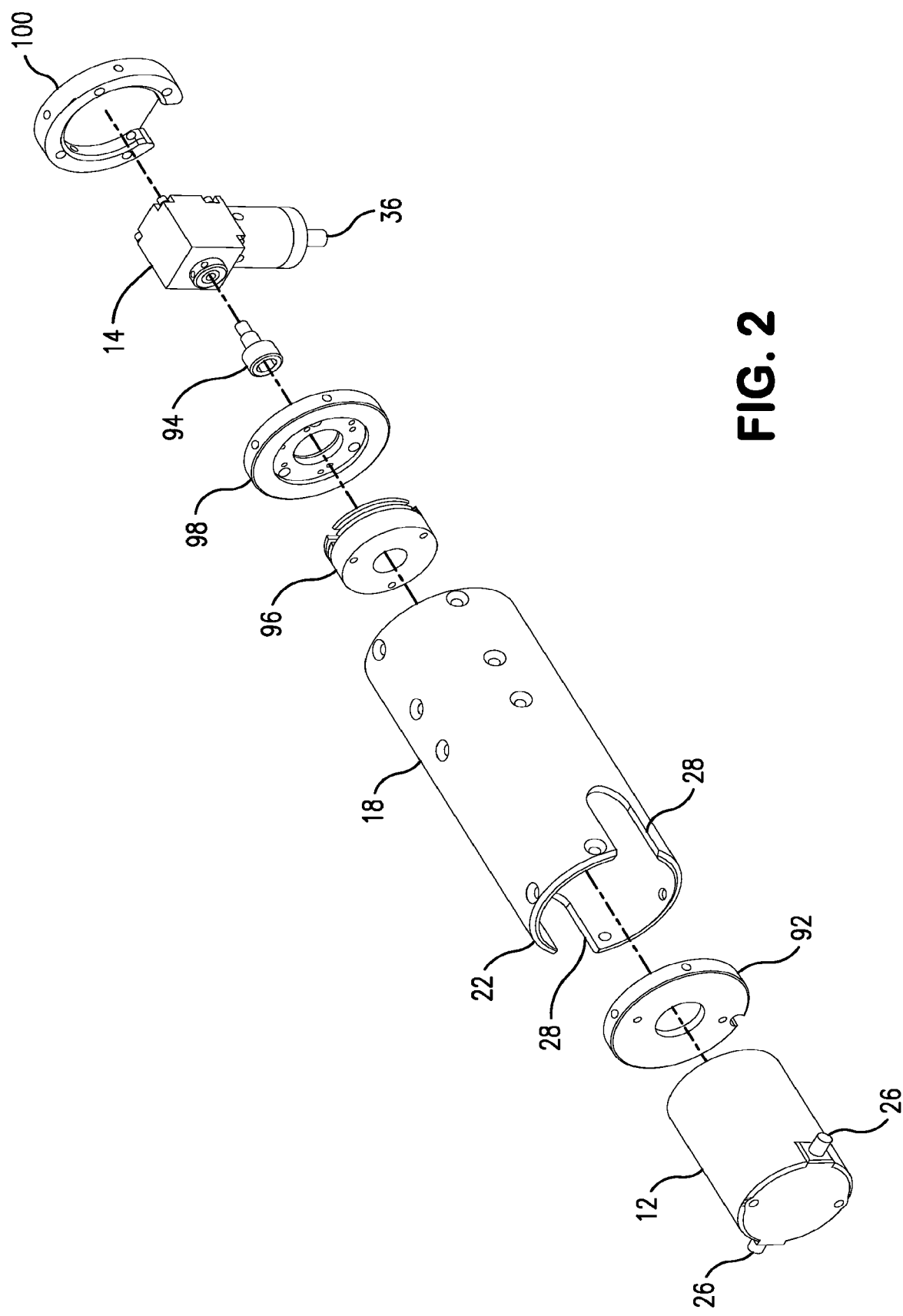
FIG. 2 is an exploded view of the power subassembly used with the portable rescue tool of the present invention.

Turning then to FIG. 2, there is an exploded view illustrating the power subassembly of the motor 12 and the angle rotary gearbox 14 within the motor housing 18. As can be seen in FIG. 2, the motor 12 is located in the proximal end 22 of the motor housing 18 such that pins 26 enter into and are located within the slots 28. A motor mount ring 92 is positioned distal to the motor 12 within the motor housing 18 to mount the motor 12 therein. As also shown, a motor shaft 94 extends outwardly from the motor 12 and connects the motor 12 to the angle rotary gear box 14. The motor 12 and motor shaft 94 have a longitudinal axis of rotation.

The angle rotary gear box 14 reduces the motor speed at a ratio of about 12:1 so that the characteristics of the output shaft 36 is one of low speed, high torque output. The motor shaft 94 can be seen to directly couple to the angle rotary gearbox 14, thereby improving efficiency and reducing the weight of further coupling components. To also improve efficiency, it can also be seen that the angle rotary gearbox 14 directly receives the rotational movement of the motor 12 and changes the direction of the longitudinal axis of rotation of the motor shaft 94 to the rotational axis of the output shaft 36 of the angle rotary gearbox 14. In the exemplary embodiment, that angle is about 90 degrees.

There is also an electrically powered brake 96 that surrounds the motor shaft 94 and is held therein by means of a mount 98 that mounts the brake 96 as well as the angle rotary gearbox 14. The brake 96 is electrically powered and is biased to its locked position preventing the motor shaft 94 from rotating, however, when power is applied to the brake 96, and also the motor 12, the brake 96 is released and the motor shaft 94 is free to rotate.

Thus, the subassembly of the motor 12 and angle rotary gearbox 14 is a compact structure, readily assembled and removable from the other components of the portable rescue tool 10 and includes a minimum of components so as to minimize the weight to facilitate the manipulation and use of the portable rescue tool 10 by a user. The motor 12 is directly coupled to the angle rotary gearbox 14 and the angle rotary gearbox 14 delivers the high torque rotational energy. The brake 96 is located directly on the motor shaft 94 since less braking is needed at the motor shaft 94 than at other locations.

Figure 3:
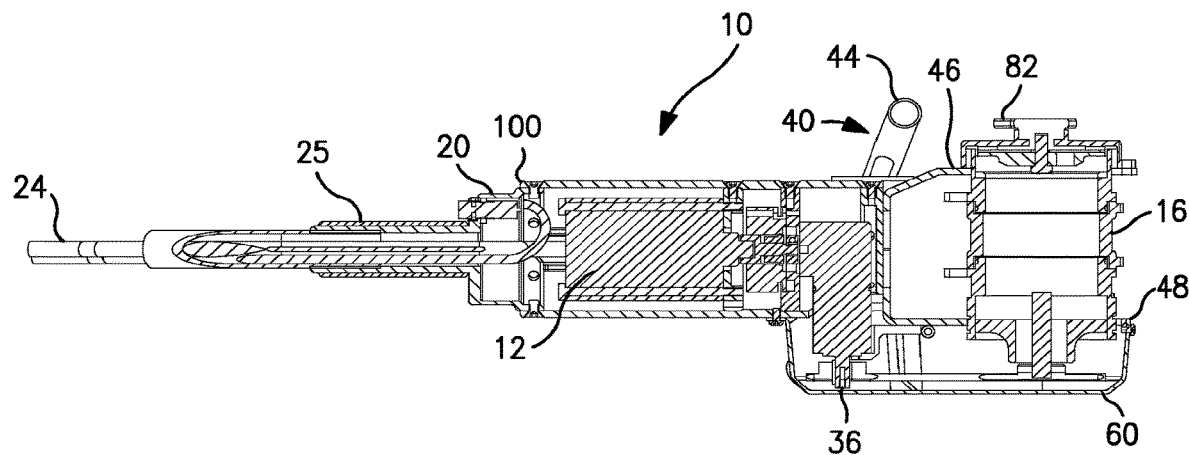
FIG. 3 is a side cross sectional view of the portable rescue tool of FIG. 1 taken along the line 3-3 of FIG. 2

Turning then to FIG. 3, there is a side cross sectional view of the portable rescue tool 10. In FIG. 3, there can be seen the overall portable rescue tool 10 and illustrating the position of the motor 12 that has a longitudinal rotational axis that is generally horizontal as depicted in FIG. 3 and the output shaft 36 of the angle rotary gearbox 14 has an axis of rotation that is generally at a right angle with respect to the axis of rotation of the motor 12.

A toggle switch 100 is provided in a location near the proximal end 22 of the motor housing 18 so as to be readily accessible to the user. By conventional wiring, the toggle switch 100 is connected between the electrical cable 24 and the motor 12 to energize and de-energize the motor 12 as well as to change the direction of rotation.

Figure 4:
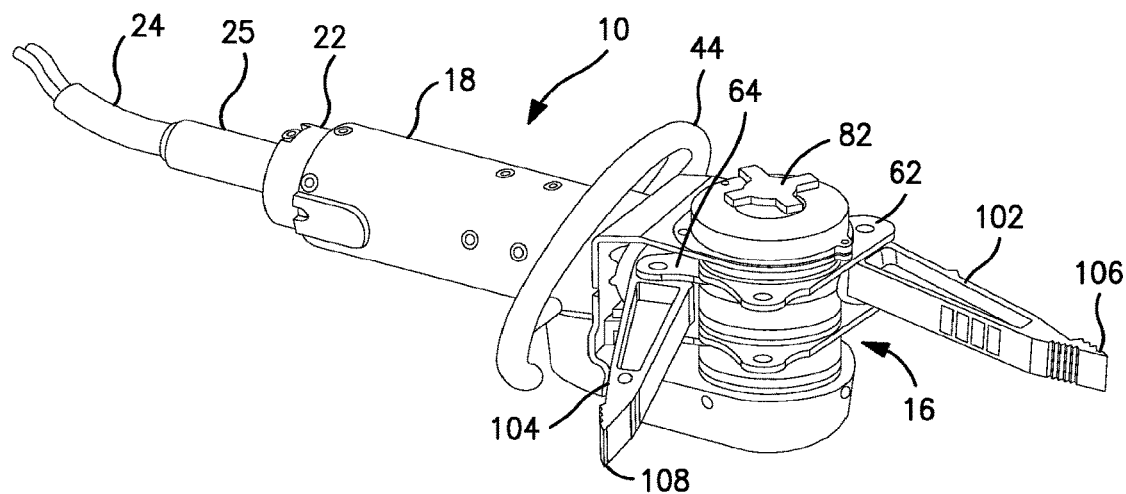
FIG. 4 is a perspective view of the portable rescue tool of FIG. 1.

Turning then to FIG. 4, taken along with FIGS. 1-3, there is shown a perspective view of the portable rescue tool 10 of the present invention. As such the angle rotary gearbox 14 is illustrated, as well as the motor housing 18 that encloses the motor 12. The electrical cable 24 extends outwardly from the proximal end 22 of the motor housing 18 and includes the rubber grip 25 that is located just adjacent to the proximal end 22 of the motor housing 18 for gripping by the user. The user can also grip the handle bar 44 that, as can be seen, is angled away from the proximal end 22 of the motor housing 22 and thus toward the working end of the portable rescue tool 10.

Accordingly, both the rubber grip 25 and the handle bar 44 are conveniently located to enable the user to grip and manipulate the portable rescue tool 10.

As also can be seen in FIG. 4, the knob 82 is located atop of the main rotating actuator 16 for retaining and releasing the main rotating actuator 16 for rotational movement.

In FIG. 4, there can also be seen, actuator arms 102, 104 that extend outwardly from the rotating actuators 62, 64, respectively, such that the distal ends 106, 108 are moved by means of the rotating actuators 62, 64 to move the distal ends 106, 108 in opposite directions, that is, the distal ends 106, 108 can be forced together to carryout a cutting action or spread away from each other for creating a space between components of, for example, an automobile in gaining access thereto.

Figure 5:
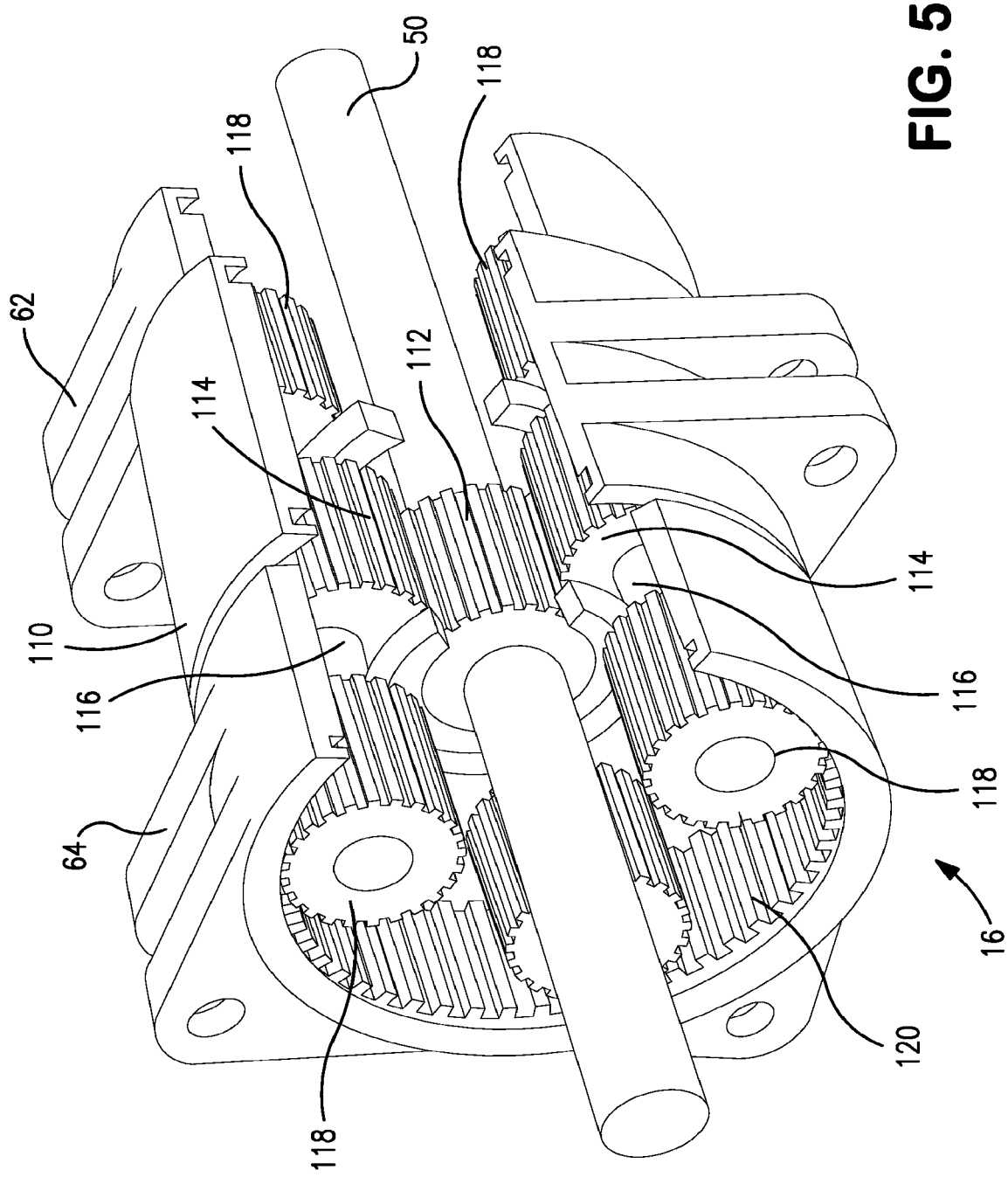
FIG. 5 is a perspective view, partially broken away, showing another of the components of the present portable rescue tool.

Finally, in FIG. 5, there is a perspective view, partially cut away, of the main rotating actuator 16. The main rotating actuator is commercially available and can be the same as that shown and described in the aforementioned U.S. Pat. Nos. 5,544,862 and 5,520,064 of Hickerson.

Basically, the main rotating actuator 16 is comprised of a housing 110 and which is flanked by the rotating actuator 62, 64. The input shaft 50 passes though the housing 110 and a main gear 112 is affixed thereto and rotates along with the input shaft 50. Main gear 112 rotates a set of four follower gears 114 (only two of which are shown in FIG. 5). The follower gears 114 are affixed to secondary shafts 116 having planetary gears 118 (again, there are two sets of planetary gears 118).

The planetary gears 118 drive inner gears 120 internal of each of the rotating actuators 62, 64 to move those rotating actuators 62, 64 either toward each other or away from each other in the operation of the portable rescue tool 10.

While the present invention has been set forth in terms of a specific embodiment or embodiments, it will be understood that the present portable rescue tool herein disclosed may be modified or altered by those skilled in the art to other configurations. Accordingly, the invention is to be broadly construed and limited only by the scope and spirit of the claims appended hereto.

What is claimed is:

1. A power subassembly for use with a portable tool, the subassembly comprising:
    an electric motor having a motor output shaft with a first axis of rotation;
    an angle rotary gearbox operably coupled to the electric motor and adapted to receive rotary motion from the electric motor and provide a low speed, high torque rotary output with a gearbox output shaft having a second axis of rotation oriented about 90 degrees from the first axis of rotation; and
    an electrically powered brake selectively movable between a locked position, wherein rotation of the motor output shaft is restricted, and an unlocked position, wherein the motor output shaft is rotatable.

2. The power subassembly of claim 1, wherein the electrically powered brake acts directly on the motor output shaft.

3. The power subassembly of claim 2, wherein when the electrically powered brake is in the unlocked position, the motor output shaft rotates when the electric motor is electrically energized.

4. The power subassembly of claim 3, wherein the electric motor and electrically powered brake are disposed within a motor housing.

5. The power subassembly of claim 4, wherein the electric motor has a pin extending outwardly therefrom and the pin engages a slot formed in the motor housing.

6. The power subassembly of claim 3, wherein the electrically powered brake is biased to be disposed in its locked position.

7. The power subassembly of claim 1, wherein the gearbox output shaft has a device adapted to limit an amount of torque transmitted by the gearbox output shaft.

8. A clutch mechanism for controlling rotation of a drive mechanism that is rotatably disposed between upper and lower plates, the clutch mechanism comprising:
    a clutch plate adapted to rotate with the drive mechanism and including a tab adapted to engage the drive mechanism;
    a clutch housing coupled to the upper plate and adapted to cover the clutch plate, and the clutch housing including a friction material that faces the clutch plate;
    a shaft passing through the clutch plate and the clutch housing and extending outwardly from the clutch housing; and
    a knob coupled to the shaft, and wherein actuation of the knob is adapted to move the clutch plate with respect to the clutch housing and cause the clutch plate to move into contact and out of contact with the friction material to control rotation of the drive mechanism.

9. The clutch mechanism of claim 8, wherein the clutch plate has a second friction material facing the friction material of the clutch housing.

10. The clutch mechanism of claim 8, wherein the shaft includes threads, and the knob is compatibly threaded.

\* \* \* \* \*